June 14, 1960 E. ALIZON 2,941,034
TRANSLATING DEVICE FOR TELEGRAPH SYSTEM COMPRISING A TWO-WIRE LINE USED FOR BOTH DIRECTIONS OF TRANSMISSION
Filed June 7, 1955
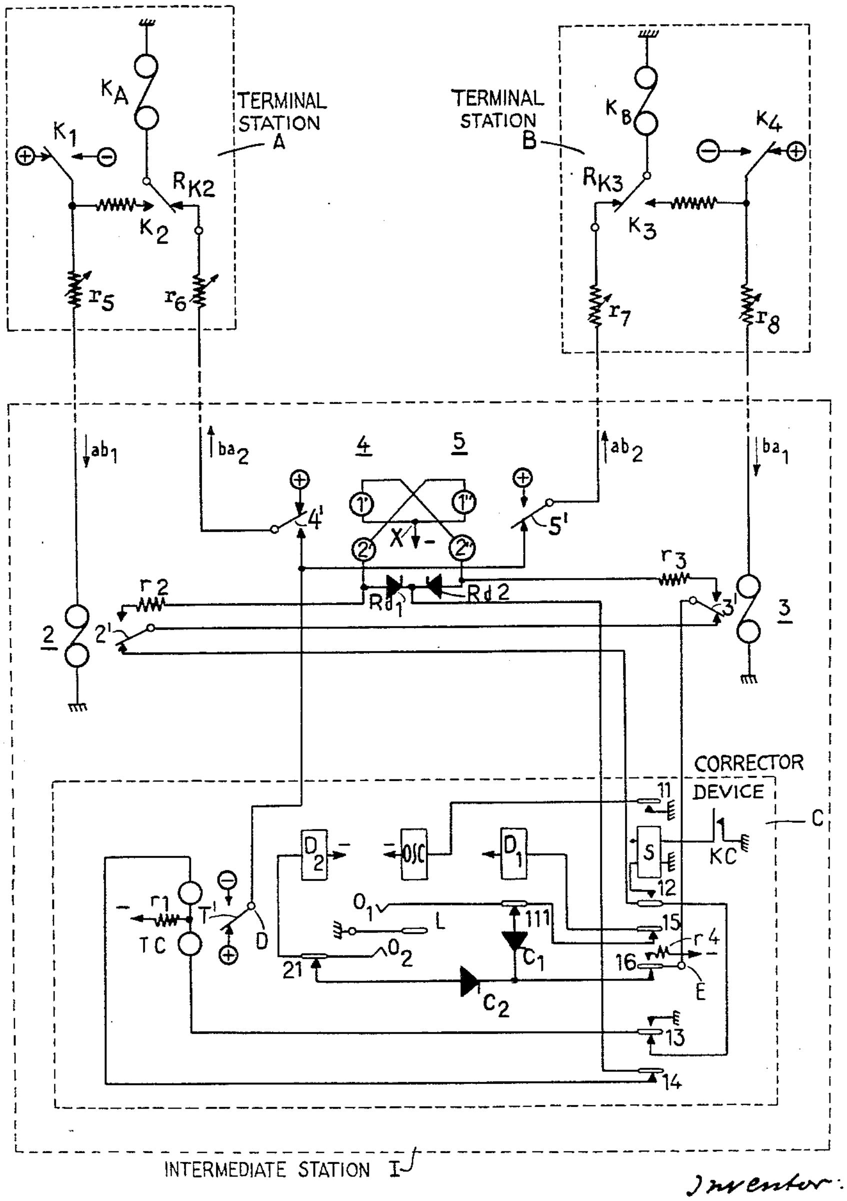
Inventor:
Etienne Alizon
By: Michael S. Striker
Attorney United States Patent Office 2,941,034

Patented June 14, 1960

2,941,034

TRANSLATING DEVICE FOR TELEGRAPH SYSTEM COMPRISING A TWO-WIRE LINE USED FOR BOTH DIRECTIONS OF TRANSMISSION

Etienne Alizon, La Celle Saint-Cloud, France, assignor to Compagnie Industrielie des Telephones, Paris, France, a French corporation Filed June 7, 1955, Ser. No. 513,743

Claims priority, application France June 28, 1954

8 Claims. (Cl. 178—71)

It is known that it is frequently necessary to insert devices, intended to modify the nature or a quality of the incoming signals on a line used for the transmission of telegraph signals. For example, signal regenerators are known which receive on an input line a modulation which may be distorted, and which restore the same modulation undistorted on an output wire.

Generally, such devices have a well-defined and irreversible direction of transmission. Consequently, on a two-wire line intended for the transmission of a modulation in both directions, it is necessary to insert two devices, one on each wire.

The main object of the present invention, on the other hand, is a signal translator device, which makes it possible to transmit and regenerate telegraph signals in two opposite directions between terminal stations, provided, however, that the signals in the two directions do not appear simultaneously.

With the above objects in mind, the translating device according to the invention is characterized in that it comprises a first pair of relays, the windings whereof are respectively inserted in input wires, coming from two terminal stations, and which apply to the input of a corrector member a polarity of the same sign as that of the signals which are received from any one of said stations, and a second pair of relays, the armatures whereof are respectively connected to the outgoing wires leading to the two stations, and which connect the output of the corrector member to that one of the outgoing lines which terminates in the station other than that which has sent the aforementioned signals.

It will also be assumed that each telegraph sign consists of a sequence of a certain number of signals, of which the polarities differ according to the sign concerned, and which is preceded by a so-called "start" signal of negative polarity, and followed by a so-called "stop" signal of positive polarity which lasts until the start signal of the next sign is transmitted.

The attached drawing shows schematically the whole of a translator device according to the invention together with two terminal stations and a corrector member although said terminal stations and said corrector member do not form per se part of the invention. However these other devices have been shown in order to help the reader to understand fully the purpose and function of the translator device according to the invention.

The telegraph system to which the present invention is applied comprises two separate terminal stations A and B which are connected with each other by a two-wire line. The two stations A and B operate alternatingly. Interposed between the two stations A and B is an intermediary station I which includes not only the relays 2, 3, 4 and 5, but also a signal corrector device C common to both stations A and B, for regenerating and retransmitting the signals. The whole arrangement can, therefore, be utilized and operated for transmitting signals both in the direction from station A toward station B, and in the direction from station B toward station A.

An arrangement of this type may be called "harmonic" and is applicable particularly in a communication system which is operated with two teleprinters which are connected with each other two-wire line and which are provided with sources of voltage supply. The intermediate station I comprises in the same manner as the terminal stations A and B a voltage source which has a grounded mid-point and serves for the transmission of telegraph signals, besides there is another voltage source utilized for internal operations (relays and motors) which may have 48 volts. In the drawing the voltage source for the telegraph signals is indicated by the symbols + and −, placed within a small circle, it being understood that the mid-point of this source is connected to ground. However the other voltage source used for operations is only indicated by a symbol −. The opposite pole of this source is indicated by the symbol for "ground."

As has been mentioned before the devices A, B and C, illustrated in the drawing and surrounded by a dotted rectangle, do not form a part of the present invention but are only shown in order to help understand the function of the translator device according to the invention. Therefore the devices A, B, C are illustrated only diagrammatically and will be described below only as far as it may be necessary for explanatory purposes.

The two terminal stations A and B are constructed identically and it is understood that either one of these stations may function as a transmitting station as well as a receiving station. These stations comprise each a main relay $K_A$ and $K_B$, respectively, a switch member $K_1$ and $K_4$, respectively, being capable of being placed in either one of two positions in which the switch lever makes contact either with the positive or with the negative pole of the first source of voltage supply. In series with the coils of the relays $K_A$, $K_D$, respectively, are switch means $K_2$ and $K_3$, respectively which are movable between the two positions, in one of which the switch arm contacts a stationary contact $R_{K2}$ and $R_{K3}$, respectively, while in the opposite position the switch member contacts a fixed contact connected to the above mentioned switch member $K_1$ and $K_4$, respectively. The switch member $K_1$ is connected via an adjustable resistor $r_5$ to one of the connecting lines $ab_1$; the contact $R_{K2}$ is connected via an adjustable resistor $r_6$ to the second wire of the connecting line indicated as $ba_2$; the switch member $K_4$ is connected via an adjustable resistor $r_8$ to the outgoing wire $ba_1$; and the contact $R_{K3}$ is connected via another adjustable resistor $r_7$ with the second wire of the connecting line indicated as $ab_2$. The corrector device C mainly comprises the following elements. It has an output terminal D and input terminal E. Connected to the output terminal D is the armature T′ operated by a relay TC which has two separable windings, the mid-point between the series connected windings being connected via a resistor $r_1$ to the minus pole of the above mentioned second source of operational voltage. The armature T′ is movable between two positions in which it makes contact either with a negative or with a positive pole of the first source of voltage used for the transmission of telegraph signals. A relay S has an energizing arrangement comprising two separate coils, one being the operating or actuating coil which is connected via an interrupter KC to ground. The second coil of the arrangement S is the "holding" coil which is connected between ground and a normally open contact 12 of this relay. The relay further comprises a normally open contact 11, two normally closed contacts 14 and 15 and two switch over contacts 13 and 16. The switch over contact 13 connects in its normal position one winding of the relay TC with the normally open contact 12, and in the opposite position it connects said winding of the relay TC with ground. The function of the other contact will become apparent from the following description of the whole system. The device C further comprises two relays $D_1$ and $D_2$ which operate normally closed contacts 111 and 21, respectively. Two rectifiers $C_1$ and $C_2$ are connected in circuit with the last mentioned contacts 111 and 21, respectively. There is further an oscillator marked OSC which is connected between the minus pole of the operational source of voltage and the normally open contact 11 of the relay S. This oscillator comprises a vibrating blade L which is capable of a certain condition to make contact with stationary contacts $O_1$ and $O_2$, respectively, located on opposite sides of the blade L which itself is connected to ground.

That part of the intermediate station I which does not consist of the corrector device C and therefore is the subject matter of the present invention, comprises, as is stated above two pairs of relays. The first pair of relays indicated at 2 and 3, respectively, have armatures 2' and 3', respectively, which are capable of moving between a corresponding pair of fixed contacts as shown. One of the fixed contacts of the relay 2, actually the lower one of the two fixed contacts, is connected to the negative pole of the operational source of voltage across the line passing through the relay S, contact 13 in its position of rest and the lower one of the two windings of the relay TC, and finally through the fixed resistor $r_1$. The lower one of the fixed contacts of the relay 3 is directly connected to the armature 2' of the relay 2 so that whenever this armature 2' is at negative potential as stated above, the fixed lower contact of the relay 3 is likewise at negative polarity. The two upper fixed contacts of the relays 2 and 3, respectively are both connected to a negative potential across fixed resistors $r_2$ and $r_3$, respectively in the following manner. The connection in question passes through one of the windings of each of the two relays 4 and 5, respectively, for instance the winding 1' of relay 4 and the winding 2'' of relay 5, or in the other case winding 2' of relay 4 and 1'' of relay 5, and it can be seen that in this manner two coils of different relays are connected in series with each other and at the same time at the mid-point X with the negative pole of the second source of potential. It should be noted that the two windings of one of the two relays 4 and 5 are wound in opposite direction, and more particularly the arrangement is such that also the two windings of the different relays are oppositely wound with respect to each other. Consequently, whenever the circuit containing the common operational negative voltage source is closed by one or the other of the upper fixed contacts of the relays 2 and 3, the armatures 4', 5' of the relays 4 and 5, respectively, will swing from one into the other position at the same time but in directions opposite to each other. The armatures 4', 5', respectively, move between a pair of fixed contacts of which the upper one is in both cases connected to a source of positive polarity for the transmission of the telegraph signals, while the other contact, the lower one of them, is connected to the output terminal D of the correcting and regenerating device C. The armatures 4', 5' respectively, of each relay 4 or 5 is connected with the transmitting wire $ba_2$ or $ab_2$, respectively, which lead to that station which happens to be the receiving one of the two terminal stations A or B. Finally, that one of the armatures 2', 3' of the receiving relays 2 and 3, respectively, which has not been otherwise connected, is connected with the input terminal E of the correcting device C.

It can be seen, that in this arrangement, provided that any one of the armatures 2', 3' of the relays 2 and 3, respectively is in its normal position of rest in contact with the associated lower one of the fixed contacts thereof, as shown in the drawing, the other armature if moved into its opposite position, will cause the energization of the windings 1', 2'' or 1'', 2' of the relays 4 and 5, respectively, depending upon the connection of the particular winding with the input line $ab_1$ or $ba_1$, as the case may be, which comes from that one of the terminal stations A or B which happens to be transmitting at the particular time. On the other hand, the regenerating and correcting device C which operates in the manner assigned to it, retransmits through its output terminal D the regenerated signals, said output terminal D being connected with one contact of each of the relays 4 and 5, respectively, so that the signals pass through the armature 4' or 5' of one of the relays which are in circuit with the output lines $ab_2$ or $ba_2$, whichever may be operating, which lead to that one of the two terminal stations B or A which at that time are receiving stations.

Recapitulating the above statements, it should be understood that whenever none of the stations A and B transmits any modulation, than the positive potential of the "stop" signal is respectively transmitted by the device A to the wire $ab_1$ and by the device B to the wire $ba_1$; consequently the relays 2 and 3 have their armatures 2', 3', respectively, in their lower positions. As far as the relays 4 and 5 are concerned, they have remained, depending upon the nature of the last signal that has been previously transmitted, either in the position shown in the drawing namely in that position in which the armature 4' is in its upper position while the armature 5' of the relay 5 is in its lower position, or, if conditions are reversed, in the corresponding opposite positions. However, in either one of these two positions of the relays 4 and 5 a positive polarity is placed on the wires $ab_2$ and $ba_2$ on account of the existence of the following circuits:

FIRST POSITION AS SHOWN IN THE DRAWING

Wire $ab_2$: lower contact of the armature T' of the relay TC, output terminal D of the device C, lower contact and armature 5' of the relay 5, wire $ab_2$;

Wire $ba_2$: upper contact and armature 4' of the relay 4, wire $ba_2$;

SECOND POSITION, OPPOSITE TO THAT SHOWN IN THE DRAWING

Wire $ab_2$: upper contact and armature 5' of the relay 5, wire $ab_2$;

Wire $ba_2$: lower contact and armature T' of the relay TC, output D of the device C, lower contact and armature 4' of relay 4, wire $ba_2$.

In order to help the reader to understand even better which possibilities are offered by the arrangement according to the invention, it may first be assumed that the terminal station A is transmitting while the station B is receiving, and afterwards the arrangement will be discussed under opposite conditions. In both cases, reference will be had to a corrector device C of the type illustrated in the drawing. This particular type of a correcting device is very well suitable to be used in the German arrangement described, but is should be understood that this particular correcting device is only mentioned and shown as an example and by no means forms part of the invention.

*(a) Relation between the station A and the intermediate station I at condition of rest*

*On wire $ab_1$.*—a positive current of rest flows through the normally closed fixed contact and the armature of the switch means $K_1$, through the resistor $r_5$ which may be adjustable in the range 1,000 ohms, through the wire $ab_1$, through the receiving relay 2 and further to the intermediate station I.

*On wire $ba_2$.*—a positive current of rest flows through the positive normally closed contact and the armature 4' of the relay 4 in the intermediate station I, through the wire $ba_2$, through a resistor $r_6$ which is adjustable in the range of 1,000 ohms, via contact $r_{K2}$ of the switch $K_2$, through the receiving relay $K_A$ and to ground.

(*b*) *Condition of rest of the intermediate station I*

Let us now consider the situation of the relays forming part of the intermediate station while the latter is at rest. The interrupter KC is moved into closed or conductive position when it is desired to start operation of the device C or this may be done automatically every time after receiving a particular character signal. If we assume that the relay S is energized by the closing of the interrupter KC, then its holding circuit is established, before the relay 2 has carried out any movement of its armature 2' as follows: From ground through the lower winding of the relay S, the operating contact 12, to closed contact of relay 2, the closed contact of relay 3, the relay contact 16, the resistance $r_4$ and finally to the negative pole of the operating source of voltage.

Since the relay S is energized the normally open contact 11 is closed whereby the oscillator OSC is energized.

(*c*) *Station A transmitting, and station B receiving*

When the station A emits the negative signal "start" then the armature of the switch member $K_1$ is in a position in which it is in engagement with the contact corresponding to the negative sign of the telegraph voltage, while the switch member of the device $K_2$ assumes a contact position suitable for effecting a local control of the transmission carried out by the receiver device $K_A$. Consequently, the transmitting current comprises two portions: one portion flows over the wire $ab_1$, while the other portion remains in the receiver device for local control purposes. At the intermediate station I, under the effect of the negative "start" impulse, the relay 2 causes its armature 2' to move into the upper position.

This swing of the armature 2' of the relay 2 under the effect of the "start" signal, interrupts the circuit of the relay S which therefore drops back into position of rest, however with a delay of 10 msec. during this short interval and as long as the relay S is not yet completely de-energized and moved to its condition of rest, nothing else happens because the following circuit is closed in itself: pole of the operating source of voltage, winding 1'' of the relay 5, winding 2' of the relay 4, resistor $r_2$, armature 2' of the relay 2 (in its upper position), armature 3' of the relay 3 (in its lower position) contact 16 of the relay S, resistor $r_4$ and—pole of the operating source of voltage.

As soon as the relay S has returned to its position of rest, the following circuits are established:

(1)—pole of the operating source of voltage, winding 1'' of relay 5, winding 2' of relay 4, resistor $r_2$, armature 2' of relay 2 (in its upper position), armature 3' of the relay (in its lower position), contact 16 of the relay S, rectifier $C_1$, ordinarily closed contact 111 of the relay $D_1$, contact $O_1$, blade L of the oscillator OSC, and from there to ground.

The armatures 4' and 5' of the relays 4 and 5, respectively, not yet in the respective positions shown in the drawing, will then swing into these positions under the influence of the windings 1'' and 2' which are included in the above described circuit.

(2) The relay TC the lower winding of which had been energized by the ground connection 13 of the relay S is connected in its operating circuit by the armature 2' of the relay 2 being in its upper position, because now as stated above the relay S is in its position of rest. The upper winding of the relay TC however, is energized by the following circuit: Pole of the operational source of voltage, resistor $r_1$, upper winding of the relay TC, contact 14 of the relay S, rectifier $Rd_1$, resistor $r_2$, armature 2' of the relay 2 (in its upper position), armature 3' of the relay 3 (in its upper position), contact 16 of the relay S, rectifier $C_1$, ordinarily closed contact 111 of the relay $D_1$, contact $O_1$, blade L and from there to ground. The negative voltage, corresponding to the negative "start" telegraph signal emitted by the station A is, as is shown in the drawing, effectively associated by the above described circuit with the upper winding of the relay TC. This relay TC swings therefore its armature P' to its upper position whereby the "start" signal is passed through the exit wire connected to the output terminal D of the intermediate station I.

(3) The relay $D_1$ is activated by the closing of contact 15 when the relay S drops back into its position of rest; the time of actuation is in the neighborhood of 1 msec. Consequently, the ground connection of the blade L, via the contact $O_1$ and the normally closed contact 111 of the relay $D_1$, could be established only during a very short time interval which is logically located at the midpoint of the duration of the arriving signal.

The positioning of the relays 4, 5 and TC is carried out by this ground connection. Therefore at the midpoint of the signal arriving at the relay 2 (in this case the "start" signal) this signal is re-emitted toward the station D by means of the following circuit: Pole of the source of telegraph voltage, armature T' of the relay TC (being in its upper position), armature 5' of the relay 5 (being in its lower position), wire $ab_2$, adjustable resistor $r_7$, switch $K_3$, receiving relay $K_B$, and from there to ground.

(4) The oscillator OSC is de-energized when the contact 11 of the relay S returns into its ordinary open position, however, actually the energization stops only 20 msec. later; consequently, the contact $O_2$ will not be touched by the blade L in the free oscillations of the latter but only 20 msec. after the relay S has dropped back into its normal position of rest, which means that logically this occurs at the midpoint of the second arriving signal.

However, 10 msec. after the dropping back of the relay S, the first signal impulse arrives at the relay 2.

It may now be assumed that the first signal impulse is a positive one. Under the assumed conditions the armature 2' of the relay 2 will now move into its lower position. The particular circuits which have been described above in the paragraphs (1) and (2) above are now interrupted as a result of the changing of position of the armature 2' of the relay 2. The lower winding of the relay TC is now placed into connection with the oscillator by the following circuit: Pole of the operational source of voltage, resistor $r_1$, lower winding of the relay TC, contact 13 of the relay S, armature 2' of the relay 2 (being in its lower position), armature 3' of the relay 3 (being also in its lower position), contact 16 of the relay S, rectifier $C_2$, contact 21 and contact $O_2$.

However, the blade L will not make contact before approximately 10 msec. have passed after the relay 2 has swung into its opposite position. When then the contact between the blade L and the contact $O_2$ is established, the relay TC swings into its lower position. The relay $D_2$ is energized due to the contact L, $O_2$ and therefore interrupts the ground connection at the contact 21, so that the relay TC, similarly as in the case of the "start" signal, has been forced to swing into its other position due to the effect of a very short pulse which is located at midpoint of the second arrived signal. The potentials which corresponds in polarity to the "start" signal is therefore disconnected from the circuit and the next following impulse which we may assume to be positive, is in turn transmitted toward the station B by the following circuit: Pole of the source of telegraph voltage, armature T' of the relay TC (being in its lower position), armature 5' of the relay 5 (being in its lower position), wire $ab_2$, and to station B.

If the next signal impulse which is received at the relay 2 is likewise positive, then the relay 2 will maintain its armature 2' in the existing position namely in engagement with the lower sixth contact as shown by the drawing. Therefore, the relay TC receives an impulse causing interruption of the ground connection with its lower winding, however only after 20 msec. following the preceding impulse whereby the existing position thereof is simply confirmed and maintained. Consequently the positive potential of the source of telegraph voltage is now again transmitted to the station B.

In case that the second signal impulse arriving is negative, then the relay 2 will swing to its upper position; the supply circuit for the lower winding of the relay TC is thereby interrupted and a new circuit is established as followers: Pole of the operational source of the voltage, resistor $r_1$, upper winding of the relay TC, contact 14 of the relay S, rectifier $Rd_1$, resistor $r_2$, armature 2' of relay 2 (being in its upper position), armature 3' of the relay 3 (being in its lower position), contact 16 of the relay S, rectifier $C_1$, ordinarily closed contact 111, contact $O_1$ and ground, the latter connection taking place as soon as the blade L touches the contact $O_1$. It is to be understood that this circuit is established and applies to all those cases where a negative impulse is received.

(*d.*) *Station B transmitting, station A receiving*

The last pulse transmitted from any transmitting station is a positive pulse ("stop" signal). After the station A ceases to transmit, the relay 2 is therefore in its lower position and the relay TC is in a similar position. The relays 4 and 5 are therefore in the condition which is illustrated by the drawing.

If now station B becomes a transmitting station, the switching device $K_3$ is moved into a position in which the negative polarity of the "start" telegraph signal is applied to the armature $K_4$.

The relay 3 then swings its armature 3' into its upper position. The lower winding of the relay S which serves to hold it in its energized position, loses its voltage supply so that the relay returns to its position of rest. It is however clear that it will take this relay 10 msec. to carry out the dropping back into the position of rest. At the moment when the relay S returns to its position of rest, the following circuits are completed:

(1) Pole of the source of operational voltage, winding 1' of the relay 4, winding 2' of the relay 5, resistor $r_3$, armature 3' of the relay 3 (being in its upper position), contact 16 of the relay S, rectifier $C_1$, ordinarily closed contact 111 of the the relay $D_1$, contact $O_1$ and to ground via the blade L.

(2) In the same manner, the upper winding of the relay TC is energized by the following circuit: Pole of the source of operational voltage, resistor $r_1$, upper winding of the relay TC, contact 14 of the relay S, rectifier $Rd_2$, resistor $r_3$, armature 3' of the relay 3 (being in its upper position), contact 16 of the relay S, rectifier $C_1$, ordinarily closed contact 111 of the relay $D_1$, contact $O_1$ and to ground via the blade L.

(3) The relay $D_1$ is energized by the ordinarily closed contact 15 of the relay S with a delay of 1 msec. Consequently, at the midpoint of the arriving "start" signal the relay 5 swings into its upper position and the relay 4 swings at the same time into its lower position at which the relay TC swings into its upper position.

(4) The oscillator OCS has been released after the relay S has dropped back into its position of rest, but there is a delay of 20 msec. so that this vibrator will not be actually and effectively in vibration before the midpoint of the duration of the second received signal. At this moment, the contact with the contact $O_2$ is established, and again after 20 msec. contact with the contact $O_1$ is made; again 20 msec. later it is the turn of the contact $O_2$, and so on continuously.

As can be seen the ground connections through the oscillator blade L occur only during a very brief time interval and are applied either to the lower winding or to the upper winding of the relay TC depending upon whether the arriving pulse is of positive or negative potential. In the case of the "start" signal arriving at the station B, the relay TC moves into its upper position, the relay 4 moves into its lower position and the relay 5 occupies its upper position. Consequently the "start" signal is retransmitted toward the station A by means of the following circuit: Pole of the source of telegraph voltage, armature T' of the relay TC (being in its upper position), armature 4' of the relay 4 (being in its lower position), adjustable resistor $r_6$, contact $R_{K2}$ of the station A, receiving relay $K_A$ and from there to ground.

It is evident that under the two assumptions discussed above, the receiving relay, which may be relay 2 or relay 3 and via the lines $ab_1$ or $ba_1$ as the case may be, and which corresponds to that station which is transmitting, receives first of all a negative "start" signal so that its armature moves into contact with a negative polarity. Then the relays 4 and 5 are energized and their armatures 4', 5', respectively, move into that position or are sustained and held in that position which determines the retransmission of the signal toward that station which at that moment is the receiving one. The output wire leading to the receiving station, which may be $ba_2$ or $ab_2$, is then connected to the output terminal D of the correcting device C while the output wire leading to the transmitting station which may be $ab_2$ or $ba_2$ is placed at the positive polarity of the "stop" signal. Otherwise, the "stop" signal which arrives from the receiving station which may be via wire $ba_1$ or $ab_1$, establishes by means of that of the receiving relays 3 or 2 which is associated with this condition, the suitable connection for establishing polarities which correspond to those of the other receiving relay at the input terminal E of the correcting device C.

In view of the above features and capabilities the whole system is always automatically prepared for operation, and in fact, this condition occurs at the moment at which the transmission is carried out and disregarding which was the condition before this moment, and also disregarding which may be the transmitting-receiving relation between the two stations A and B. After the "start" signal has been passed through the arrangement the intelligence signals can be transmitted in the regular way to the translating device according to the invention and to the correcting device C from where these signals are retransmitted, after regeneration, to the actual receiving station.

It can be seen that in view of the above description of the structure and function of the whole arrangement according to the invention it is possible to use one signal translating device for transmitting and regenerating telegraph signals which derive from two terminal stations which alternate between being transmitting and receiving stations, respectively.

It will be understood that each of the elements described above, or two or more together, may also find a useful application in other types of translating device for telegraph installations differing from the types described above.

While the invention has been illustrated and described as embodied in translating device for telegraph installations comprising a two-wire connection between two terminal stations, it is not intended to be limited to the detals shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a two-wire telegraphy system in combination at least one pair of spaced terminal stations each adapted to operate indifferently as transmitting or receiving station, each terminal station having a transmitting portion respectively including at least a first conductor for exclusively transmitting telegraphic signals to the other of said stations, each of said stations also having a receiving portion respectively including at least a second conductor for exclusively receiving the telegraphic signals transmitted from the other of said stations; a single intermediate regenerator station connected in circuit between said pair of terminal stations, first switching means for connecting the input of said intermediate regenerator station with one or the other of said first conductors, said first switching means being controlled by the passing of the telegraphic signals in either of said first conductors, second switching means for directly connecting the output of said intermediate regenerator station with one or the other of said second conductors, said second switching means being also controlled by the passing of the telegraphic signals in either of said first conductors, the conductors effectively connected by said first and second switching means being such that at any moment of the transmission of telegraphic signals on the first conductor of one terminal station, the telegraphic signals are transmitted to the other terminal station on the second conductor thereof.

2. In a two-wire telegraphy system in combination at least one pair of spaced terminal stations each adapted to operate indifferently as transmitting or receiving station, each terminal station having a transmitting portion respectively including at least a first conductor for exclusively transmitting telegraphic signals to the other of said stations each of said stations also having a receiving portion respectively including at least a second conductor for exclusively receiving the telegraphic signals transmitted from the other of said stations; a single intermediate regenerator station connected in circuit between said pair of terminal stations, first and second switching means for connecting said intermediate regenerator station in circuit, said first switching means including at least two groups of windings associated with one of said first conductors, respectively, and responsive to telegraphic signals passing therein and first movable means responsive to said two groups of windings, said first movable means being adapted to connect the input of said intermediate regenerator station with one or the other of said first conductors, said second switching means including at least another two groups of windings associated with one of said first conductors, respectively, and with the other of said second conductors, respectively, said other two groups of windings being responsive to telegraphic signals passing in either of said first conductors, and second movable means adapted to be controlled by said other two groups of windings whereby the output of said intermediate regenerator station is connected with the second conductor associated with the other of said first conductors thereby to transmit the telegraphic signals received from one terminal station in a regenerated form toward the other terminal station.

3. In a two-wire telegraphy system in combination at least one pair of spaced terminal stations each adapted to operate indifferently as transmitting or receiving station, each terminal station having a transmitting portion respectively including at least a first conductor for exclusively transmitting telegraphic signals to the other of said stations, each of said stations also having a receiving portion respectively including at least a second conductor for exclusively receiving the telegraphic signals transmitted from the other of said stations; a single intermediate regenerator station connected in circuit between said pair of terminal stations, first and second switching means for connecting said intermediate regenerator station in circuit, said first switching means including at least two groups of windings associated with one of said first conductors, respectively, and responsive to telegraphic signals passing therein and first movable means responsive to said two groups of windings, said first movable means being adapted to connect the input of said intermediate regenerator station with one or the other of said first conductors, said second switching means including at least another two groups of windings associated with one of said second conductors, respectively, and second movable means adapted to connect the output of said intermediate regenerator station with either of said second conductors, said first movable means being also adapted to energize selectively one or the other of the groups of windings in said other two groups of windings whereby said second movable means permits the telegraphic signals received on the first conductor of one terminal station to pass in a regenerated form on the second conductor of the other terminal station.

4. In a two-wire telegraphy system in combination at least one pair of spaced terminal stations each adapted to operate indifferently as transmitting or receiving station, each terminal station having a transmitting portion respectively including at least a first conductor for exclusively transmitting telegraphic signals to the other of said stations, each of said stations also having a receiving portion respectively including at least a second conductor for exclusively receiving the telegraphic signals transmitted from the other of said stations; a single intermediate regenerator station connected in circuit between said pair of terminal stations, first and second switching means for connecting said intermediate regenerator station in circuit, said first switching means including at least two groups of windings associated with one of said first conductors, respectively, and responsive to telegraphic signals passing therein and first movable means responsive to said two groups of windings, said first movable means being adapted to connect the input of said intermediate regenerator station with one or the other of said first conductors, said second switching means including at least another two groups of windings associated with one of said first conductors and with the second conductor associated with the other of said first conductors, and second movable means adapted to connect the output of said intermediate regenerator station with one of said second conductors and to disconnect the output of said intermediate regenerator station from the other of said second conductors, said first movable means being also adapted to energize relatively one or the other of the groups of windings in said other two groups of windings, the connected first and second conductors being associated with two different terminal stations thereby to pass telegraphic signals received on the first conductor of one station in a regenerated form on the second conductor of the other terminal station.

5. In a two-wire telegraphy system in combination at least one pair of spaced terminal stations each adapted to operate indifferently as transmitting or receiving station, each terminal station having a transmitting portion respectively including at least a first conductor for exclusively transmitting telegraphic signals to the other of said stations, each of said stations also having a receiving portion respectively including at least a second conductor for exclusively receiving the telegraphic signals transmitted from the other of said stations; a single intermediate regenerator station connected in circuit between said pair of terminal stations, first and second switching means for connecting said intermediate regenerator station in circuit, said first switching means including at least two groups of windings each associated with one of said terminal stations and responsive to telegraphic signals passing in corresponding one of said first conductors and first movable means adapted to connect in response to said groups of windings the input of said intermediate regenerator station to the associated one of said terminal stations, said second switching means including at least another two groups of windings each associated with one of said terminal stations, respectively, and second moving means responsive to either group of said other groups of windings adapted to connect the output of said intermediate regenerator station with the non-associated one of said terminal stations.

6. In a two-wire telegraphy system in combination at least one pair of spaced terminal stations each adapted to operate indifferently as transmitting or receiving station, each terminal station having a transmitting portion respectively including at least a first conductor for exclusively transmitting telegraphic signals to the other of said stations, each of said stations also having a receiving portion respectively including at least a second conductor for exclusively receiving the telegraphic signals transmitted from the other of said stations; a single intermediate regenerator station connected in circuit between said pair of terminal stations, first and second switching means for connecting said intermediate regenerator station in circuit, said first switching means including at least two groups of windings each associated with one of said terminal stations and responsive to telegraphic signals passing in corresponding one of said first conductors and first movable means adapted to connect in response to said groups of windings the input of said intermediate regenerator station to the associated one of said terminal stations, said second switching means including at least another two groups of windings, each associated with the first conductor of one terminal station and the second conductor of the other terminal station and a pair of the movable means each associated with one of said terminal stations, respectively, each group of said other two groups of windings being responsive to telegraphic signals passing in the associated first conductor, both ones of said pair of movable means being responsive to either of said groups of windings and adapted to either connect the associated second conductor of the other terminal station with the output of said intermediate regenerator station or disconnect the non-associated second conductor.

7. In a two-wire telegraphy system for start-stop code signals in combination at least one pair of spaced terminal stations each adapted to operate indifferently as transmitting or receiving station, each terminal station having a transmitting portion respectively including at least a first conductor for exclusively transmitting telegraphic signals to the other of said stations, each of said stations also having a receiving portion respectively including at least a second conductor for exclusively receiving the telegraphic signals transmitted from the other of said stations; a single intermediate regenerator station connected in circuit between said pair of terminal stations; first and second switching means for connecting said intermediate regenerator station in circuit; said first switching means including two groups of windings each connected in series relation with one of said first conductors and first movable means responsive to said groups of windings adapted to connect the input of said intermediate regenerator station in accordance with the polarity of the code unit element received on either of said first conductors; second switching means including other two groups of windings, an energizing source for said other two groups of windings, and second movable means; wherein either of said other two groups of windings is adapted to be mounted in parallel relation with said energizing source, said second movable means including two armatures each associated with one of said second conductors and each movable between two corresponding contacts, one of said corresponding contacts being at the stop polarity, the other being permanently connected with the output of said intermediate regenerator station, and each armature being connected to corresponding second conductor; wherein each of said other group of windings is so arranged that upon energization thereof, said armatures move into engagement with corresponding contacts of different kinds; and wherein said first movable means is adapted upon reception of a start polarity signal on one of said first conductors to connect one or the other of said other two groups of windings with the energizing source depending upon which of said first conductors is receiving the start polarity signal, the correspondence of said other groups of windings with said two armatures respectively being such, that the polarity received during transmission of each character on the first conductor from either one terminal station and derived in regenerated form from the output of said intermediate regenerator station is effectively transmitted on the outgoing second conductor corresponding to the other terminal station.

8. In a telegraphy system, in combination, at least one pair of spaced terminal stations, each of said terminal stations having a transmitting portion for transmitting telegraphic signals to the other of said stations, each of said stations also having a receiving portion for receiving the telegraphic signals transmitted from the other of said stations; an intermediate regenerator station connected in circuit between said pair of terminal stations and having an input connected in circuit with the transmitting portions of each of said terminal stations and having an output connected in circuit with the receiving portions of each of said terminal stations; first switching means connected in circuit between said input of said intermediate station and said transmitting portions of said terminal stations, said first switching means being movable between a first position, wherein said input of said intermediate station is directly connected to said transmitting portion of one of said terminal stations and disconnected from said transmitting portion of the other of said terminal stations, and a second position wherein the connections of said first switching means are reversed, said first switching means including a first pair of relays, each of said relays respectively having relay windings respectively connected to the transmitting portion of one of said terminal stations and having relay switching contacts connected to the input of said intermediate regenerator station; and second switching means connected in circuit between said output of said intermediate station and said receiving portions of said terminal stations, said second switching means being movable between a first position wherein said output of said intermediate station is directly connected to the receiving station of one of said terminal stations and disconnected from said receiving portion of the other of said terminal stations, and a second position wherein the connections of said second switching means are reversed, said second switching means including a second pair of relays, each of said second pair of relays having a first and a second relay winding, the first relay winding of one of said second pair of relays and the second relay winding of the other second pair of relays being connected in series with the switching contacts of one of said first pair of relays, and the second relay winding of said one of said second pair of relays and the first relay winding of said other of said second pair of relays being connected in series with the switching contacts of the other of said first pair of relays.

References Cited in the file of this patent

UNITED STATES PATENTS

| | | |
|---|---|---|
| 1,472,463 | Eaves | Oct. 30, 1923 |
| 1,736,786 | Herman | Nov. 26, 1929 |
| 1,817,989 | Kruse | Aug. 11, 1931 |
| 1,834,279 | Jarvis | Dec. 1, 1931 |
| 1,965,347 | Knoop | July 3, 1934 |
| 2,047,091 | Amann et al. | July 7, 1936 |
| 2,055,575 | Herman | Sept. 29, 1936 |
| 2,761,896 | Foley | Sept. 4, 1956 |